UNITED STATES PATENT OFFICE.

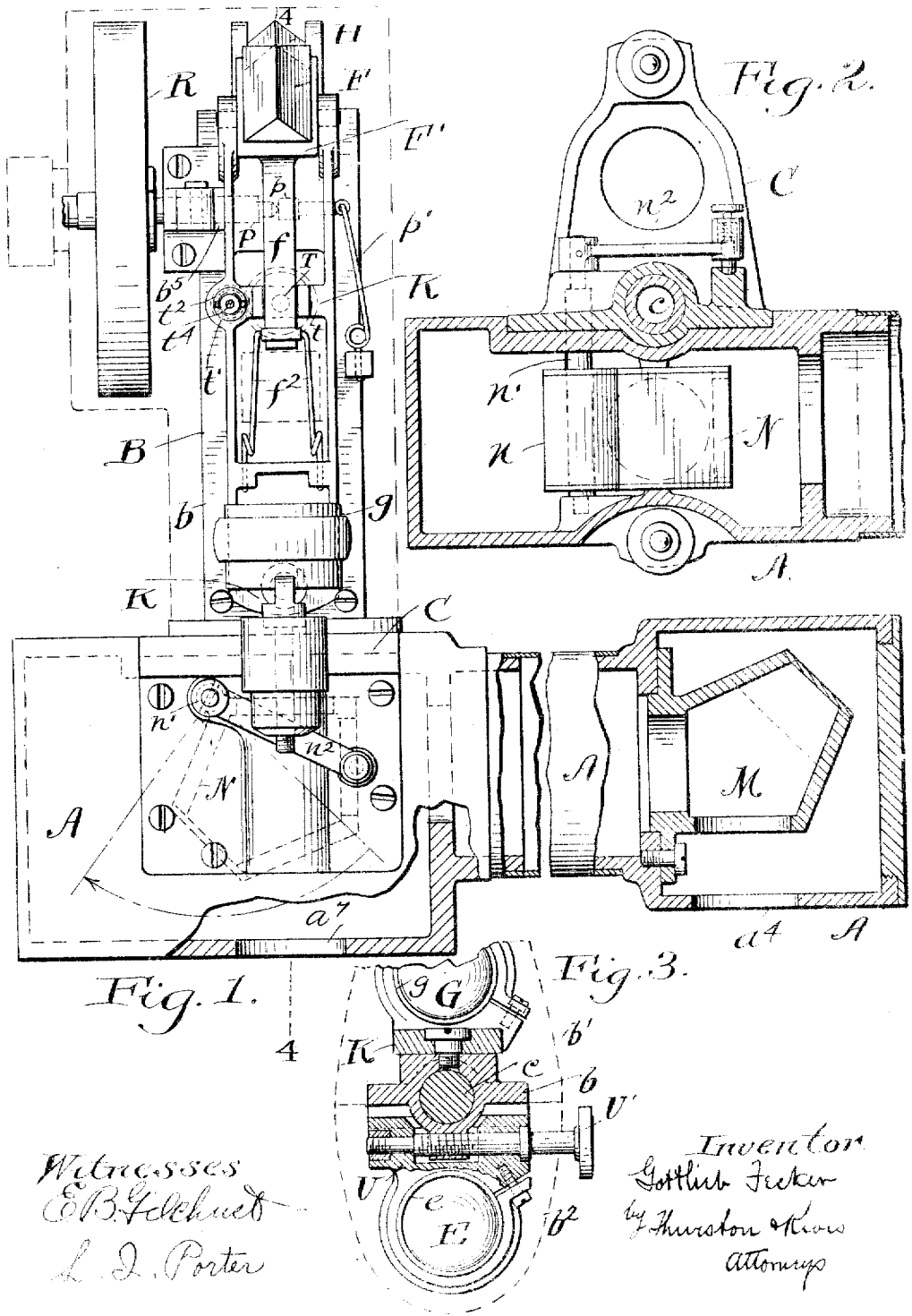

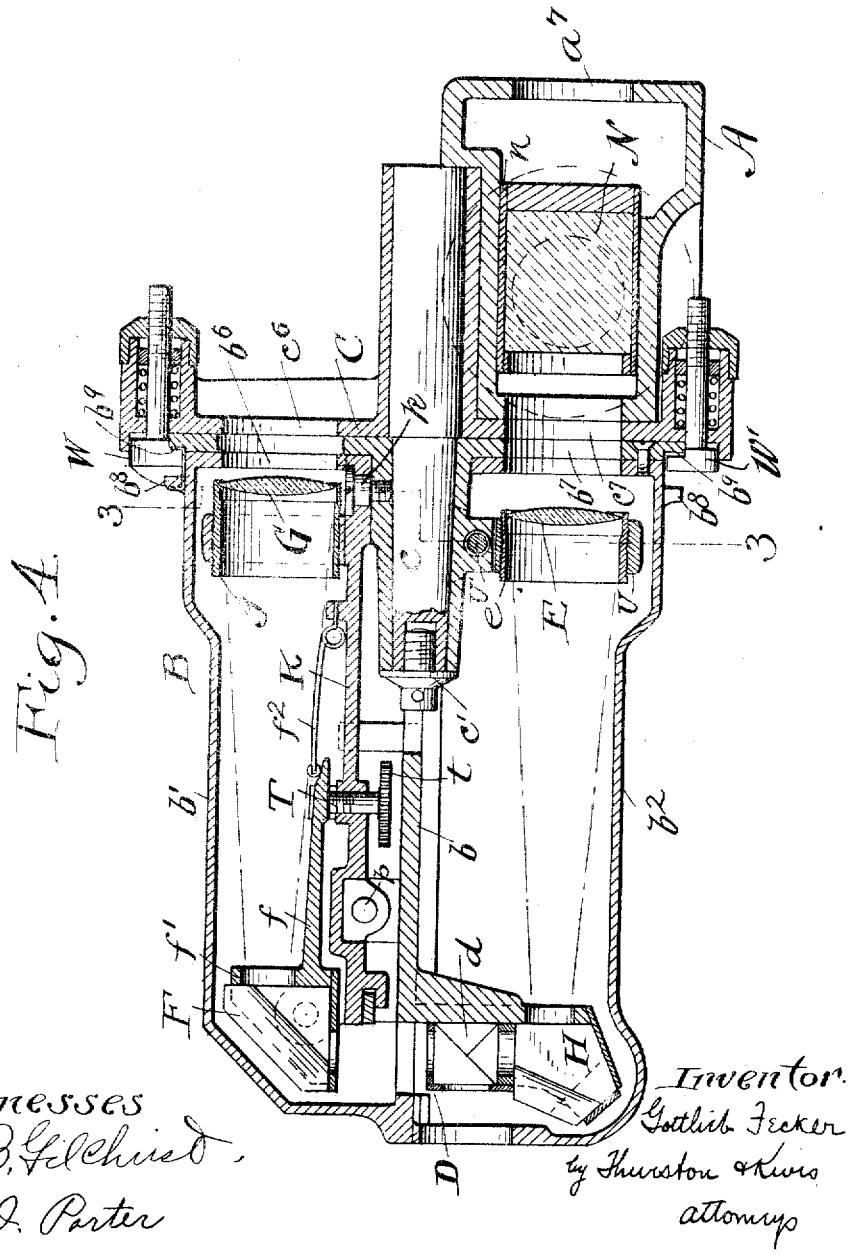

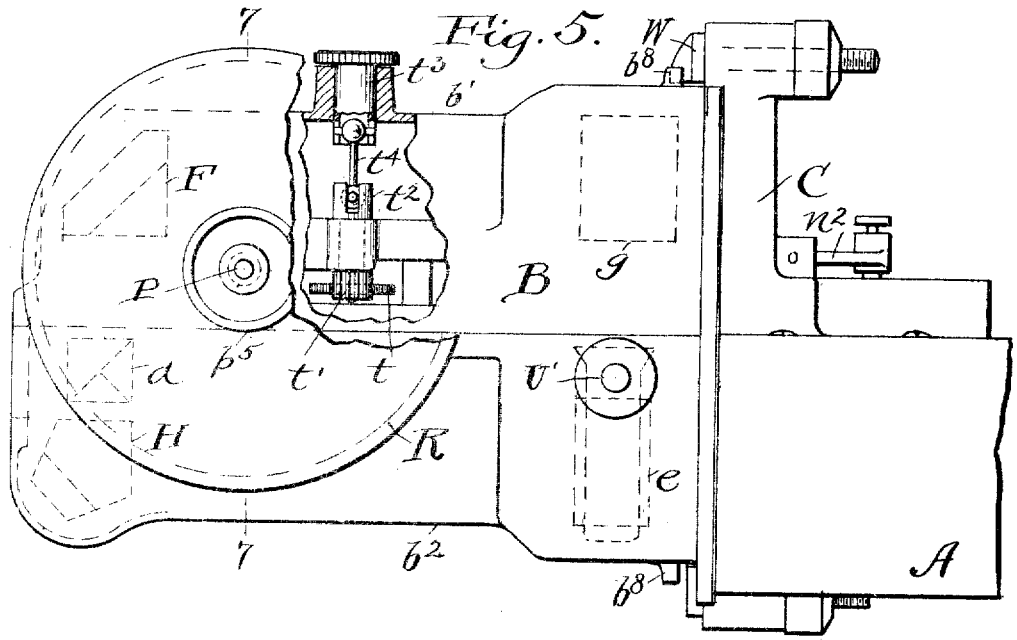
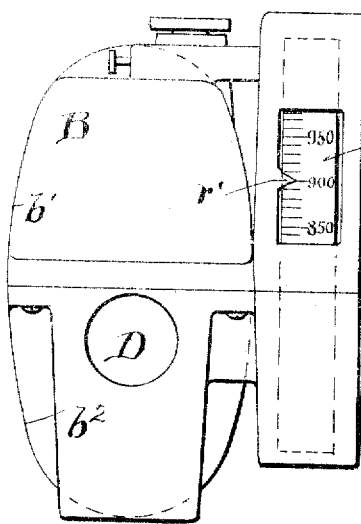
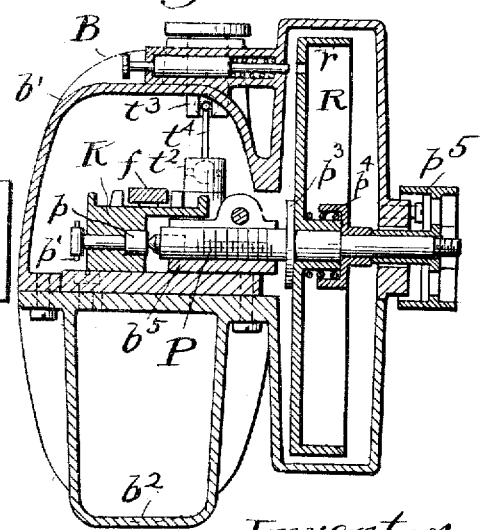

GOTTLIEB FECKER, OF CLEVELAND, OHIO, ASSIGNOR TO THE WARNER AND SWASEY COMPANY, OF CLEVELAND, OHIO, A CORPORATION OF OHIO.

RANGE-FINDER.

1,269,171.  Specification of Letters Patent.  Patented June 11, 1918.

Application filed July 13, 1914. Serial No. 850,643.

*To all whom it may concern:*

Be it known that I, GOTTLIEB FECKER, a citizen of the United States, residing at Cleveland, in the county of Cuyahoga and State of Ohio, have invented a certain new and useful Improvement in Range-Finders, of which the following is a full, clear, and exact description.

This invention relates to improvements in coincidence telemeters,—that is to say, to the sort of range finders which include two telescopes having normally parallel axes and a common eye piece in which appear the two images from the respective telescopes located on opposite sides of a line which divides the field into two image fields, together with means for causing such angular deflection of one of the telescopes as will cause the alinement or coincidence of the two images, and means for indicating the extent of such deflection in suitable terminology.

Generally speaking, the object of the invention is to produce a self contained and easily portable instrument which is not likely to get out of order, and which will give quickly, and with the degree of accuracy required, information as to the distance of any object from the instrument, within the limits of its capacity.

The instrument in which the invention is embodied is believed to be unique in that it is the first self contained range finder which is self collimating,—that is to say, it contains wholly within itself means for determining whether the two telescopes are exactly collimated, as well as the means by which this condition may be brought about when the indicator is at zero.

The invention consists in the construction and combination of parts shown in the drawing and hereinafter described and definitely pointed out in the appended claims.

In the drawing, Figure 1 is a plan view of the instrument when the casing which covers the telescopes is removed, and when the base line tube has its middle broken away, and its right end and the contents thereof sectioned and a portion of the left end also broken away and sectioned. Fig. 2 is a front elevation of the left end of the instrument, the base line tube being shown in vertical section. Fig. 3 is a sectional view in the plane of line 3—3 on Fig. 4. Fig. 4 is a vertical sectional view in the plane of line 4—4 on Fig. 1. Fig. 5 is a side elevation partly broken away of the instrument. Fig. 6 is a rear elevation of the instrument; and Fig. 7 is a vertical sectional view in the plane indicated by line 7—7 on Fig. 5.

The instrument has two main frame members, viz., the base member A and the head B. Each of these is composed of several rigidly connected parts. The base member A is a tube which when the instrument is in use occupies a substantially horizontal position with its axis at right angles to a line passing therefrom to the object under observation. A bracket plate C is fixed to this tube and thereby becomes in effect a part of the base member.

The head B is built up of several parts, viz., the body $b$, and two casing members $b^1$, $b^2$,—all of which are rigidly connected together. The bracket plate C carries a horizontal stud $c$, on which the body $b$ of the head is pivoted, said body being held on said stud by a screw $c^1$.

In this head and protected by the outer casing members thereof are two telescopes, which are so mounted that their optical axes may be parallel with one another, and with the mechanical axis of the head, and lie on opposite sides of said mechanical axis, and in the same vertical plane therewith.

These two telescopes have a common eye piece D which is fixed to the body $b$, and includes a right angle reflecting prism $d$, which is so set that the line in which the two reflecting planes intersect is horizontal and at right angles to the vertical plane in which the optical axis of the two telescopes lie. This line therefore divides the field into two image fields, viz., one above the line in which appears the image from the upper telescope and one below the line in which appears the image from the lower telescope.

The lower telescope includes the objective lens E and its cell $e$ which are supported by the body $b$, and the reflecting pentaprism H which is fixedly held in proper relation to said objective and eye piece. This prism is an erecting prism, and therefore the image from the lower telescope in the lower image field of the eye piece is erect or right side up.

The upper telescope includes the objective lens G and its cell g and the half inverting reflecting prism F arranged in proper relation to said objective and the eye piece D, wherefore the image from this telescope appears inverted in the upper image field of the eye piece.

The lower telescope is fixed to the body b, so that its optical axis is preferably at right angles to the base line (to be presently explained) of the instrument. The normal position of the upper telescope (when the indicator to be hereinafter described shows zero) is such that its optical axis is parallel with the optical axis of the lower telescope. The upper telescope, however, is capable of angular displacement, and this is because both the objective G and the prism F of this telescope are carried on an arm K which is pivoted to the body b by the screw k, whose axis is at right angles to but in the same vertical plane which includes the optical axes of the two telescopes and the mechanical axis about which the head B turns.

In the base tube A adjacent to the lower telescope is a reflecting pentaprism N, which, when the instrument is being used to measure distances, coöperates with another reflecting pentaprism M in the opposite end of the base tube, so as to reflect the light rays which enter said tube through hole $a^4$ directly in front of the latter prism, so that they are directed into the lower telescope. The base line of the instrument (which is the base line of the triangle whose perpendicular is to be ascertained by the instrument) is an imaginary line drawn from and at right angles to the central light ray which enters tube A through the opening $a^4$ and the central light ray which enters the lower telescope, the length of said line being equal to the length of any light ray which passes from prism to prism. In the instrument this base line is 31½ inches long.

The prism N is mounted in the holder n which is pivoted within the tube A on a spindle $n^1$ having a vertical axis, said spindle projecting upward out through the tube, and there being connected with it outside of the tube an arm $n^2$, by means of which the prism may be swung into the operative position, such that it reflects the light rays from prism M into the lower telescope.

Now, to use this instrument to measure distances, it is fixed in such position that the axis of the tube A is substantially horizontal and at right angles to a line passing to the object under observation. The prism N is now in the operative position described. Now the light rays from the object whose distance is to be measured, as, for example, the flag pole or the vertical corner of a building, will enter the hole $a^4$ at right angles to the base line aforesaid, and will be reflected from prism M to prism N, and thence into the lower telescope. The image of the object will appear in the eye piece right side up in the lower image field. At the same time the light rays from the same object will pass directly into the upper telescope and the image of the same object will appear half inverted in the upper field of the eye piece, but at a greater or less distance to the left of the lower image.

By swinging the arm K upon its pivot the optical axis of the upper telescope may be made to proceed directly to the distant object. When this has been brought about, the two images in the two image fields will then appear with their corresponding upright lines in alinement, and on opposite sides of the line which divides the image field. When the instrument is in this condition, a right angle triangle has been formed, of which the base corresponds to the base line of the instrument before explained, which, in the instrument shown, is 31½ inches long, and whose perpendicular is the distance of the object from the instrument. If one knows the angular deflection of the upper telescope required to bring about the stated coincidence of corresponding parts of the two images, he has the data for calculating the value of the perpendicular of said triangle, or, in other words, the distance of the object from the instrument.

The deflection of the upper telescope is due, as stated, to the swinging of the arm K upon which the objective and the prism are mounted. A screw P having a hard conical point is screwed through a boss $b^5$ which is a part of the body b, and the point bears against the wearing plate p carried by said swinging arm. A spring $p^1$ acts to swing the arm against the screw and resists the opposite movement which is produced by screwing in the screw. This screw carries the indicator dial R which is provided with a circumferential flange r which is graduated for coöperation with the pointer $r^1$. This indicator is adjustably connected with said screw, by means to be explained later.

This dial might be graduated to show in minutes and seconds the angular deflection of the upper telescope. If it were, then the operator could, because he knows the length, 31½ inches, of the base line of the triangle which has been erected, calculate the length of the perpendicular of said triangle, which is the distance of the object from the instrument. But preferably the graduations of the dial are in terms of translated equivalents,—in this particular instrument of the angular deflection of the upper telescope, viz., in figures representing in feet the length of the perpendiculars of the triangles having always the same base line, and a suitable number of the various opposite angles produced by the deflection of said telescope. The described instrument is practically efficient for all distances from 400 to 18000 feet, and the graduations show a sufficient number of these distances for practical purposes.

From the foregoing it will be clear that in the instrument there are two optical trains terminating in a common eye piece. The objective opening of these two optical trains are at opposite ends of a base line of known length within the tubular base member. One of these trains includes the lower telescope whose optical axis is at right angles to said base line; the other train includes the upper telescope whose optical axis is normally parallel with the axis of the lower telescope.

The prism F which is carried by the swinging arm is itself secured in a holder $f^1$ which is part of a lever $f$ which is pivoted to said swinging arm K on an axis at right angles to the pivot of said arm. A spring $f^2$ engages this lever and holds it against the end of a screw T, which screw is mounted in the swinging arm, and has a little pinion $t$ fixed to it. This pinion is engaged by a long pinion $t^1$ fast to a rotating shaft $t^2$ which is mounted in the body $b$. An operating shaft $t^3$, which projects out through the casing so that the operator may turn it, is connected with shaft $t^2$ by an intermediate member $t^4$ having a universal joint connection with both shafts. This mechanism will remain operative, irrespective of the position of the swinging arm and furnishes a means by which the position of the reflecting surface of the prism F relative to the optical axis of the telescope and the eye piece prism $d$ may be varied. This enables the operator, by swinging this prism supporting lever, to cause the image in the upper field to move up or down, as required, to bring the lower part of said image into the desired relation to the horizontal line which divides the image field. This is frequently desirable because one may, by properly positioning the entire instrument, bring the lower image into proper relation to the dividing line. The adjustment of this lever, as before stated, is the means by which the upper image may be brought into a corresponding relation to said dividing line.

Mention has been made of the fact that this instrument is self collimating. If one desired to determine whether or not the two telescopes are collimated,—that is to say, to determine whether the optical axes thereof are parallel, he will swing the prism N back out of operative position, and will then sight some distant object, and to whatever extent is necessary will cause the swinging of the arm K until the two images are alined. He will then turn the entire head on the supporting stud a distance of 180 degrees, and will then sight the object. If the two images are not then in alinement, he knows that the instrument is not accurately collimated and proceeds to make the necessary adjustment to bring about the desired collimation.

If the two images do not coincide when the indicator is at zero, he knows that the indicator needs adjustment with respect to the screw. He then turns said screw and thereby deflects the upper telescope until the two images do coincide. Then he swings the entire head 180 degrees upon the supporting mechanical axis; and if the images now coincide he knows that the two telescopes are collimated. In that event he readjusts the indicator to the zero position if necessary. The indicator disk is mounted on the screw adjacent to a flange $p^3$, against which said disk is forced by a spring $p^4$, which causes sufficient friction to cause the dial to turn with the screw, but not enough to prevent the dial from being turned on the screw for adjustment purposes.

If, when the instrument is so tested, it appears that the two telescopes are not collimated, the position of the optical axis of the lower telescope may be changed by a movement of the objective cell $e$ horizontally as much as may be necessary. This is easily accomplished because the objective cell is secured in a clamp U which is slidably supported on the body member $b$ and is movable for adjustment purposes by the screw $U^1$.

There are holes $b^6$, $c^6$ in the casing member $B^1$ and the bracket C for the direct passage of light rays to the upper telescope. There are other holes $b^7$, $c^7$ for the passage of light rays from tube A to the lower telescope; and there is also a hole $a^7$ in tube A in alinement with the holes $b^7$, $c^7$ for the passage of direct light rays to the lower telescope when the prism N is moved out of operative position.

The head may be stopped and held in either of the two positions thereof referred to by lugs $b^8$ secured to said head, and the spring plungers W, $W^1$, of which the first may be engaged by either lug, and both may enter either of two notches $b^9$ in a flange on said head.

It is to be understood that the terms horizontal and vertical, as herein used, are relative, and not absolute terms, because the instrument will operate equally well in whatever position in which it may be placed, provided it is directed at a suitable object. That is to say, an object having outlines which are at right angles to the line dividing the image field in the eye piece.

Several so-called reflecting prisms are shown and referred to herein. But those skilled in this art will understand that it is only the reflecting qualities of these prisms that are made use of in the normal operation of the instrument, and that therefore any suitable and properly arranged reflecting surfaces may be employed instead of the prisms.

Having described my invention, I claim:

1. A range finder, which includes a tubular base member having an objective opening adjacent one end, and two separated reflectors in said tubular member bounding the base line of the instrument, and a head which is rotatably supported on said base member, two telescopes supported by said head, one fixed thereto with its optical axis parallel with and above the mechanical axis of the head, and the other telescope being located below the mechanical axis of the head and in such position that its own axis will normally lie in the same vertical plane as the axis of the upper telescope and the mechanical axis of the head,—said lower telescope being capable of angular deflection about an axis which lies in the same vertical plane above mentioned, means for angularly deflecting the second telescope, and means indicating in desired terminology the extent of such deflection.

2. A range finder which includes a tubular base member having an objective opening adjacent one end, and two separated reflectors in said tubular member bounding the base line of the instrument, and a head which is rotatably supported on said base member, two telescopes supported by said head, one fixed thereto with its optical axis parallel with and above the mechanical axis of the head, and the other telescope being located below the mechanical axis of the head and in such position that its own axis will normally lie in the same vertical plane as the axis of the upper telescope and the mechanical axis of the head,—said lower telescope being capable of angular deflection about an axis which lies in the same vertical plane above mentioned, means for angularly deflecting the second telescope, and means indicating in desired terminology the extent of such deflection, means for fixing the head in either of two positions 180° apart, and means for displacing that reflector in the base line tube which is adjacent to said head.

3. A range finder comprising a tubular base member having an objective opening adjacent one end and containing two reflectors which define the base line of the instrument, a head fixed to said base member adjacent the end opposite to that at which the objective opening is formed, a telescope fixed to said head in coöperative relation with the adjacent reflector in the base member, an arm which is pivoted to said head, a second telescope carried by said arm, means for turning said arm in its supporting axis, means for determining when the axes of the two telescopes are parallel, and indicating means which move proportionately to said angular deflection of said arm, said indicating means being adjustably connected with said means for turning said arm.

4. In a range finder, the combination of a horizontal frame member, two reflectors secured thereto at a known distance apart, and two normally collimated telescopes supported by said frame member with their optical axes normally parallel in the same vertical plane, one of said telescopes being fixed directly behind one reflector and the other telescope being mounted to swing out of the plane in which said optical axes lie but in a plane at right angles thereto, an eye piece common to both telescopes and having a right angle reflecting prism which is so set that the line in which its two reflecting planes intersect is at right angles to the plane in which the optical axes of the two telescopes lie when they are parallel, and an indicator which moves in proportion to the said swinging movement of said movable telescope.

5. In a range finder, the combination of a horizontal frame member, two reflectors secured thereto at a known distance apart, two normally collimated telescopes which are supported by said frame member with their optical axes normally parallel and in the same vertical plane, one of said telescopes being fixed directly behind one prism for coöperation therewith and the other telescope being mounted for angular deflection out of the plane in which said optical axes lie, but in a plane at right angles thereto,— the reflector which coöperates with the first named telescope being movable into and out of operative position, means for causing the angular deflection of the other telescope, and an indicator which moves proportionately to the deflection of said telescope.

6. In a range finder, the combination of a horizontal frame member, two reflectors secured thereto at a known distance apart and two normally collimated telescopes supported by said frame member with their optical axes normally parallel and in the same vertical plane, an eye piece common to both telescopes, which eye piece includes a reflecting prism whose reflecting planes intersect in a line which is at right angles to the vertical plane in which the optical axes of said telescopes normally lie, the lower telescope being fixed in operative relation to said eye piece and to the adjacent reflector carried by the horizontal frame member, the upper telescope comprising an objective and a reflecting prism, an arm which is pivoted to swing in a horizontal plane to which said objective is secured, a lever pivoted to said arm to which the prism of said telescope is secured, means for swinging said lever into any desired position, means for swinging said arm, and an indicator which moves proportionately to said arm.

7. A range finder which includes two optical trains that begin at opposite ends of a known base line, each train including a telescope,—which telescopes are arranged one above the other with their axes normally parallel and in a vertical plane which is at right angles to said base line, an arm to which one of said telescopes is fixed, which arm is pivoted on a vertical axis which is in the same vertical plane above mentioned, means for swinging said arm, and an indicator which moves proportionately to the angular movement of said arm, an eye piece which is common to both telescopes, said eye piece having a right angle reflecting prism which is set so that the two reflecting surfaces meet in a plane at right angles to the plane which passes through the optical axes of both telescopes when said axes are parallel, and reflectors respectively intermediate of said right angle prism and the two telescopes.

8. In a range finder, the combination of a tubular base member having an objective opening, a telescope fixed with respect to said base member with its axis at right angles to the optical axis of said base member, two reflectors in said base member one directly behind said objective opening and one located adjacent said telescope to reflect thereto the light rays which enters said opening, a second telescope pivotally connected with said base member on an axis which is at right angles to the optical axis of said base member and which is capable of occupying a position such that its optical axis is parallel with the optical axis of the first mentioned telescope, means for deflecting and for measuring the deflection of said pivoted telescope, an eye piece common to both telescopes, two reflectors located respectively between said two telescopes and said common eye piece, and a right angle reflecting prism adjacent said eye piece which is set with its two reflecting surfaces respectively in the path of the light rays from the two last named reflectors and with the line in which said surfaces meet at right angles to a plane which passes through the optical axes of both telescopes, which said axes are parallel.

9. In a range finder, the combination with a tubular base member having an objective opening, a telescope fixed with respect to said base member with its axis at right angles to the optical axis of said base member, two reflectors in said base member one directly behind said objective opening and one adjacent said telescope whereby light rays entering said objective opening are reflected into said telescope, an arm pivotally supported upon said base member upon an axis and which is at right angles to a plane which passes through the optical axis of the base member and the optical axis of the fixed telescope, a telescope fixed to said pivoted arm, means for deflecting and measuring the deflection of said arm, an eye piece common to both telescopes and having a right angle reflecting prism whose reflecting surfaces meet in a line that is at right angles to a plane which passes through the optical axes of said two telescopes when said axes are parallel, a fixed reflector intermediate of the first named telescope and said right angle reflecting prism, a lever pivoted to the pivoted arm referred to, a reflector carried by said lever for transmitting light rays from the last named telescope to said right angle prism, and means to rock said lever upon its pivot.

In testimony whereof, I hereunto affix my signature in the presence of two witnesses.

GOTTLIEB FECKER.

Witnesses:
 EDWARD P. BURRELL,
 EUGENE C. BROWN.